United States Patent
Carpenter et al.

(10) Patent No.: US 8,967,715 B2
(45) Date of Patent: Mar. 3, 2015

(54) ANCHOR LATCH SYSTEM FOR CHILD RESTRAINT SYSTEMS AND CHILD CAR SAFETY SEATS

(71) Applicant: Graco Children's Products Inc., Atlanta, GA (US)

(72) Inventors: Jason A. Carpenter, Denver, PA (US); Daniel J. Layden, Marietta, GA (US); John Bachner, Macedonia, OH (US); Arthur Lee Gehr, Jr., East Earl, PA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/671,352

(22) Filed: Nov. 7, 2012

(65) Prior Publication Data

US 2013/0127218 A1    May 23, 2013

Related U.S. Application Data

(60) Provisional application No. 61/556,775, filed on Nov. 7, 2011.

(51) Int. Cl.
    *B60N 2/28* (2006.01)

(52) U.S. Cl.
    CPC ............ *B60N 2/2821* (2013.01); *B60N 2/2866* (2013.01); *B60N 2/2887* (2013.01)
    USPC ........................................................ 297/253

(58) Field of Classification Search
    CPC ... B60N 2/2821; B60N 2/2866; B60N 2/2887
    USPC ............................................... 297/253, 250.1
    See application file for complete search history.

(56) References Cited

U.S. PATENT DOCUMENTS

| 5,383,708 A | 1/1995 | Nagasaka et al. |
| 7,597,396 B2 | 10/2009 | Longenecker et al. |
| 8,056,975 B2 | 11/2011 | Longenecker et al. |
| 8,256,840 B2 * | 9/2012 | Dasent et al. ................. 297/253 |
| 2013/0001992 A1 * | 1/2013 | Hartenstine et al. ....... 297/250.1 |

FOREIGN PATENT DOCUMENTS

EP    2540564 A1 *    1/2013

OTHER PUBLICATIONS

Clek, Oobr Instruction Manual, 36 pages, Apr. 1, 2012.

* cited by examiner

*Primary Examiner* — Milton Nelson, Jr.
(74) *Attorney, Agent, or Firm* — Lempia Summerfield Katz LLC

(57) ABSTRACT

A child restraint system has a bottom portion configured to rest on a dedicated seat of a vehicle. The bottom portion has a front end, a rear end, and a pair of sides. An anchor latch system is carried by the bottom portion and has two latch belts partially housed within the bottom portion. Each latch belt has an anchor end protruding rearward from and external to the bottom portion. An adjuster is exposed on at least one side or the front end of the bottom portion. The adjuster can be manipulated to selectively retract or pay out the two latch belts simultaneously. The adjuster can have an adjustment belt protruding from one side of the bottom portion. The adjuster can have a knob positioned on the front end, one side, or both sides of the bottom portion.

7 Claims, 8 Drawing Sheets

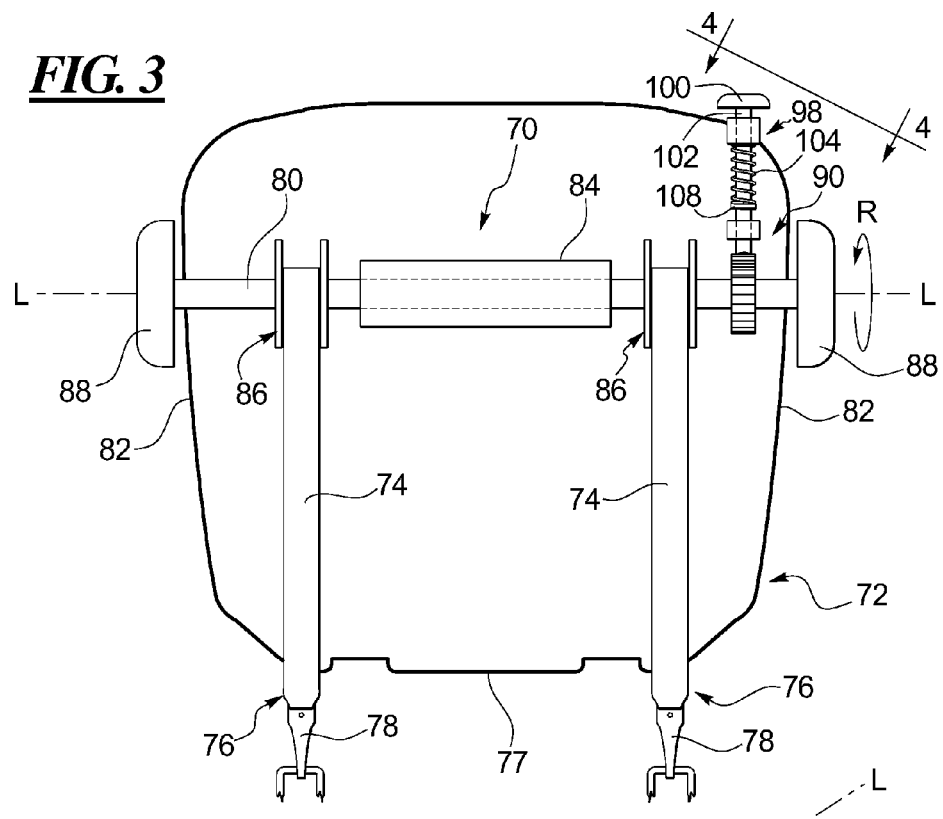
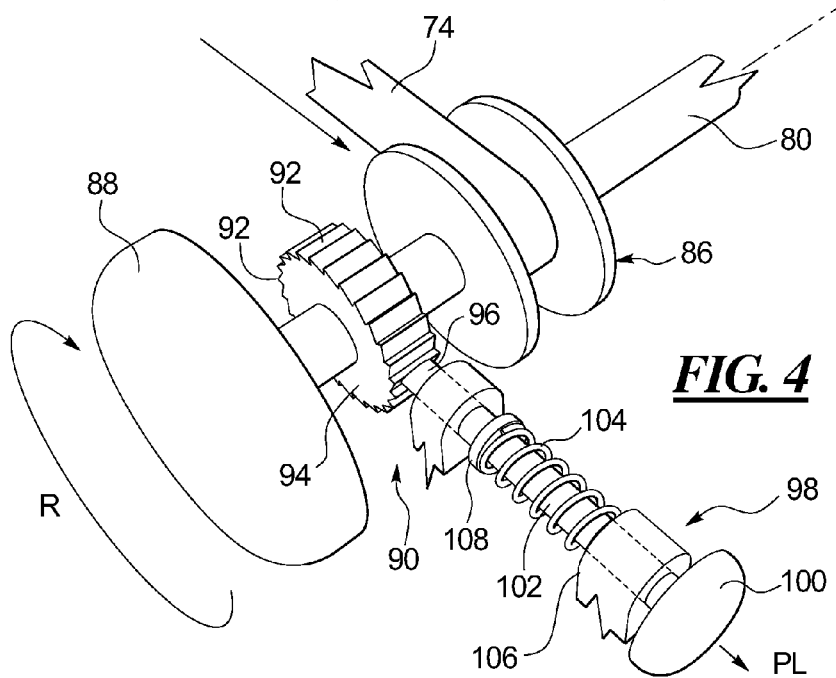

ANCHOR LATCH SYSTEM FOR CHILD RESTRAINT SYSTEMS AND CHILD CAR SAFETY SEATS

RELATED APPLICATION DATA

This patent is related to and claims priority benefit of U.S. provisional application Ser. No. 61/556,775 filed on Nov. 7, 2011 for "Adjustable Anchor Latch Systems and Mechanisms for Child Restraint Systems and Safety Seats." The entire contents of this prior filed provisional application are hereby incorporated herein by reference.

BACKGROUND

1. Field of the Disclosure

The present disclosure is generally directed to safety anchor latches and systems for child seats, and more particularly to an adjustable anchor latch system for child restraint systems and child safety seats.

2. Description of Related Art

Anchor latch systems for child safety seats and child restraint systems are known in the art. Such systems are provided in order to anchor a child restraint system, and particularly the seat or the mounting base of such a system to fixed anchor points of a vehicle seat. Some of these systems offer length adjustment of the latch system belts or straps link the seat or base to the anchor points. Most of these types of systems include one or more belts or straps that are manually length adjustable prior to connecting the belts or straps to the anchor points when securing the seat or base in place on the vehicle seat.

U.S. Pat. Nos. 7,597,396 and 8,056,975 are believed to be assigned to Chicco USA. Each discloses anchor latch systems for attaching a seat base to a vehicle seat. These patents disclose a system with one adjustment strap located at the front or back edge of the base that can be manipulated to adjust two anchor latch straps or belts connected to the vehicle anchor points. Such adjustment can be done after the straps or belts have been connected to the anchor points on the vehicle seat.

Clek Oober offers a seat with an adjustable anchor latch system that is similar to the above-mentioned patents. U.S. Pat. No. 5,383,708 also discloses several embodiments of such systems.

These types of anchor latch systems often require a user to undertake an awkward stance when adjusting the latch belts. Many of these types of anchor latch systems also require the user to pull on an adjustment belt in an awkward direction when installing and securing the child restraint system. These systems can cause discomfort for the user and can make it more difficult for the user to securely latch and tighten the child restraint system within the vehicle.

SUMMARY

In one example according to the teachings of the present invention, a child restraint system has a bottom portion configured to rest on a dedicated seat of a vehicle. The bottom portion has a front end, a rear end, and a pair of sides extending between the front and rear ends and spaced apart from one another across the bottom portion. An anchor latch system is carried by the bottom portion and has two latch belts partially housed within the bottom portion, each having an anchor end protruding rearward from and external to the bottom portion. An adjuster is exposed on at least one side of the pair of sides of the bottom portion. The adjuster can be manipulated to selectively retract or pay out the two latch belts simultaneously.

In one example, the bottom portion can be a seat bottom or a booster seat. In another example, the bottom portion can be a base on which a child seat can be mounted.

In one example, the child restraint system can include one of the adjusters on each side of the bottom portion.

In one example, the adjuster can be a rotatable knob coupled to the two latch belts.

In one example, the adjuster can be an adjustment belt coupled to the two latch belts.

In one example according to the teachings of the present invention, a child restraint system has a bottom portion configured to rest on a dedicated seat of a vehicle. The bottom portion has a front end, a rear end, and a pair of sides extending between the front and rear ends and spaced apart from one another across the bottom portion. An anchor latch system is carried by the bottom portion and has two latch belts partially housed within the bottom portion, each having an anchor end protruding rearward from and external to the bottom portion. A rotatable knob is exposed on an exterior of the bottom portion. The rotatable knob can be manipulated to selectively retract or pay out the two latch belts simultaneously.

In one example, the knob can be on the front end of the bottom portion.

In one example, the knob can be on one of the pair of sides of the bottom portion.

In one example, one of the knobs can be positioned on each of the pair of sides of the bottom portion and either one of the knobs can be rotated to adjust the two latch belts simultaneously.

In one example, the knob can be pushed or pulled to release the two latch belts.

In one example, the knob can be spring biased so that part of the adjuster engages whereby the knob can only be rotated in one direction, which will retract or withdraw the latch belts into the bottom portion.

In one example, the knob can be configured to selectively engage part of the adjuster to permit rotation in only one direction to retract or withdraw the latch belts into the bottom portion, and the knob can be pushed or pulled to disengage part of the adjuster to permit the knob to be rotated in a direction opposite the one direction, which will permit the latch belts to be paid out or extended from the bottom portion.

In one example, the knob can be coupled to a shaft that carries a spool for each of the two latch belts, and wherein the latch belts wind up on the spools when retracted or withdrawn into the bottom portion and unwind from the spools when paid out or extend from the bottom portion.

In one example, the knob can be coupled to a rod or shaft and ends of the two latch belts can be connected to the rod or shaft. The latch belts can wind up on the rod or shaft when retracted or withdrawn into the bottom portion and unwind from the rod or shaft when paid out or extend from the bottom portion.

In one example, the adjuster can include a rod coupled to a one-way ratchet mechanism.

In one example, the adjuster can include a shaft extending transversely across the bottom portion, a knob on an end of the shaft, spools carried on the shaft for and connected to each of the two latch belts, a first toothed element carried on the bottom portion, and a second toothed element carried on the shaft. The first and second toothed elements can engage one another in a first configuration whereby the knob can be rotated to rotate the shaft only in one direction to retract or withdraw the two latch belts into the bottom portion. The first and second toothed elements can be disengaged in a second configuration whereby the knob can be rotated to rotate the shaft opposite the one direction to permit the two latch belts to be paid out or extended from the bottom portion.

In one example, the adjuster can include a yoke slidably supported between a pair of tracks with the two latch belts connected to the yoke, a threaded shaft coupled to the yoke, and a knob on an end of the threaded shaft. The knob can be rotated to rotate the shaft in one direction to retract or withdraw the two latch belts into the bottom portion. The knob can be rotated to rotate the shaft opposite the one direction to permit the two latch belts to be paid out or extended from the bottom portion.

BRIEF DESCRIPTION OF THE DRAWINGS

Objects, features, and advantages of the present invention will become apparent upon reading the following description in conjunction with the drawing figures, in which:

FIG. 3 shows a schematic or simplified top view of another example of an anchor latch system for a child restraint system and constructed in accordance with the teachings of the present invention.

FIG. 4 shows a close up perspective view of a portion of the anchor latch system shown in FIG. 3.

DETAILED DESCRIPTION OF THE DISCLOSURE

A number of examples of anchor latch systems for a child restraint system are disclosed herein that solve or improve upon one or more of the above-noted and/or other problems and disadvantages with prior known anchor latch systems and child restraint systems. In one example, an anchor latch system is disclosed herein that has an adjuster positioned on a side of a bottom portion of a child restraint system whereby manipulation of the adjuster adjusts two separate latch belts simultaneously. In one example, an anchor latch system is disclosed herein that has an adjuster positioned on each side of the bottom portion of the child restraint system whereby either one of the adjusters can be manipulated to adjust two anchor belts simultaneously. In one example, an anchor latch system is disclosed herein that has a rotatable knob positioned external to a bottom portion of a child restraint system whereby the knob can be rotated to adjust two anchor belts simultaneously. In one example, the knob is positioned on a front end of the bottom portion. In one example, the knob is positioned on a side of the bottom portion. In one example, a knob is positioned on both sides of the bottom portion whereby either knob can be rotated to adjust the two latch belts simultaneously. These and other objects, features, and advantages of the present invention will become apparent to those having ordinary skill in the art upon reading this disclosure.

Figure 1:
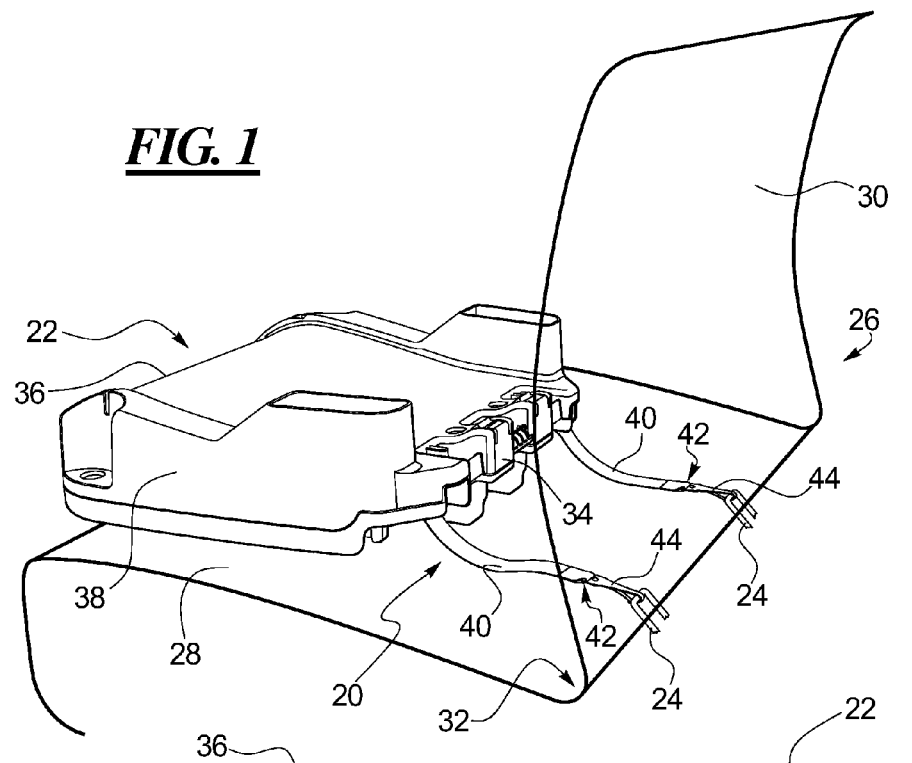
FIG. 1 shows one example of a child restraint system constructed in accordance with the teachings of the present invention, the child restraint system resting on and anchored to a dedicated seat of a vehicle.
Figure 2:
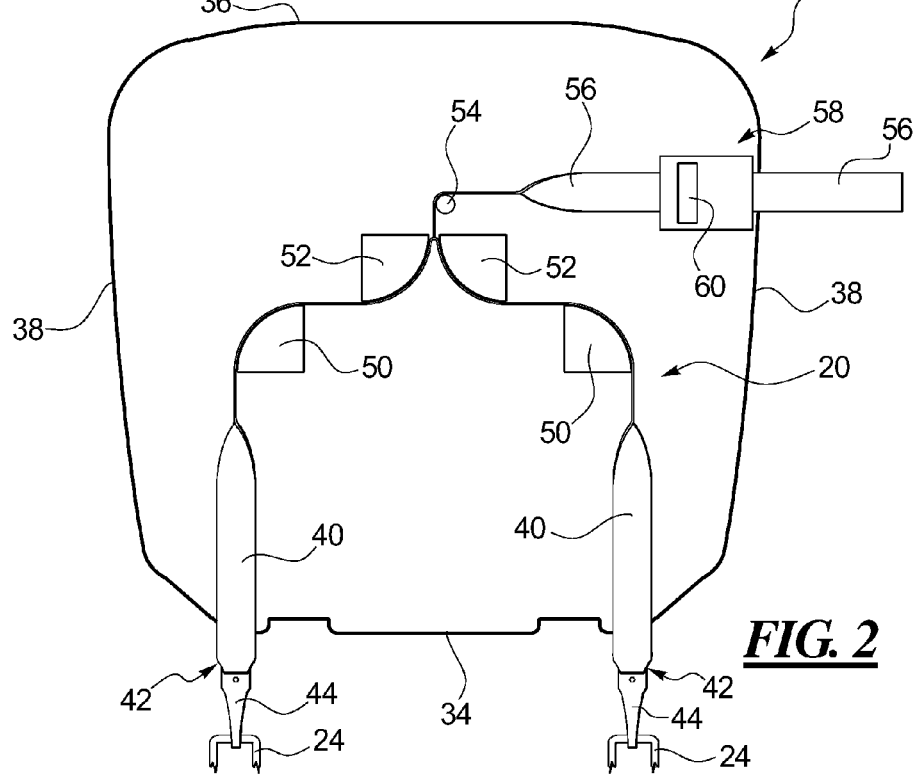
FIG. 2 shows a schematic or simplified top view of one example of an anchor latch system for the child restraint system shown in FIG. 1 and constructed in accordance with the teachings of the present invention.

Turning now to the drawings, FIGS. 1 and 2 illustrate one example of a child restraint system with an anchor latch system 20 constructed in accordance with the teachings of the present invention. In this example, the child restraint system is a booster seat 22, which is generally known to be a seat bottom without a seat back. The booster seat 22 is attached or anchored to fixed anchors 24 on a dedicated vehicle seat 26 within in a vehicle. The vehicle seat 26 generally has a seat bottom 28 and a seat back 30 and the booster seat 22 rests on top of the seat bottom. The fixed anchors 24 in this example are U-shaped rings or loops affixed to a portion of the vehicle at a seat bight region 32 between the seat bottom 28 and seat back 30 of the vehicle seat 26. In general, the anchor latch system 20 is carried by a bottom portion of a child restraint system. In this example the anchor latch system 20 is carried by the booster seat 22. A booster seat is typically used for elevating a child that is sitting on the vehicle seat 26 so that the vehicle's shoulder strap can be properly positioned on the child.

As will be evident to those having ordinary skill in the art, the configuration and construction of the vehicle seat 26 can vary considerably within the spirit and scope of the present invention. The fixed anchors 24 can also vary in construction and position within the vehicle. Also, the configuration and construction of the child restraint system, such as the booster seat 22, can also vary. The child restraint system can be an infant carrier system with a carrier shell that has an integral seat bottom and seat back. The shell is typically supported on a separate base that is anchored to the vehicle seat. Likewise, the child restraint system can be a more traditional toddler seat having both a seat bottom and a seat back. The seat bottom and seat back can be integral with one another or detachable relative to one another. Some toddler seats also have a separate base that can optionally be used and to which the seat can be mounted for smaller children. The bottom portion noted above that carries the anchor latch system disclosed herein can be the seat bottom or the base of any of these types of child restraint systems.

In this example, the booster seat 22 has a rear end 34 that coincides with the seat bight region 32 of the vehicle seat 26 when installed. The booster seat 22 also has a front end 36 positioned opposite the rear end 34 and has a pair of sides 38 that join the front and rear ends and that are spaced apart from one another across a width of the booster seat. The anchor latch system 20 has a pair of latch belts or straps 40 that are partly housed within the bottom portion or booster seat 22. Each latch belt 40 has an anchor end 42 that protrudes rearward from and external to the booster 22. In the disclosed example, each of the anchor ends 42 of the latch belts 40 extends rearward from the rear end 34 of the booster seat. A connector 44 is attached to the free end of each of the anchor ends 42 on the latch belts 40. The connectors 44 in this example are hooks or clips designed to clip onto and engage a corresponding one of the loops of the vehicle's fixed anchors 24.

As will be evident to those having ordinary skill in the art, the anchor belts 40 can be fabric belts or straps, cords, ropes, woven belts, wires, or other such structures and yet fall within the spirit and scope of the present invention. The latch belts 40 can also be comprised of two or more of these different types of structures as desired, particularly portions that are guided or redirected as discussed below. The connectors 44 can also vary from the disclosed hooks or clips and can instead be clamps, buckles, fasteners, snap connectors, spring clips, or the like. Likewise, the vehicle anchors 26 can vary and can be configured to engage, mate with, or otherwise attach or connect to the particular type of connector 44 utilized on the anchor belts 40. Also, the latch belts 40 can protrude from different portions of the child restraint system, such as the booster 22, other than the rear end 34. For example, the latch belts 40 can protrude from an underside of the child restraint system, sides of the bottom portion near the rear end, a top side near the rear end, or the like and yet fall within the spirit and scope of the present invention.

With reference to FIG. 2, the booster seat 22 has a plurality of belt guides 50, 52, 54 that are placed and positioned within the booster seat to route the latch belts 40 along a predetermined and desired path. In this example, the latch belts 40 are spaced apart from one another and generally parallel to one another and to a lengthwise or front-to-rear center axis near the rear end 34 of the booster seat 22. Each of the latch belts 40 is redirected from that orientation by one of the guides 50 through about a 90° angle and toward the center axis and the other of the latch belts. Each of the latch belts 40 is then redirected by another of the guides 52 along a lengthwise or central axis of the booster seat 22. The latch belts 40 are connected to one another at a Y-joint at this point and are then either connected to or create thereat a single adjustment belt 56. The adjustment belt 56 in this example is then redirected from the lengthwise orientation or direction by another of the guides 54 toward a side 38 of the booster seat 22. A latch mechanism 58 is provided on the booster seat 22 adjacent that side 38. The adjustment belt 56 is routed through the latch mechanism 58 and protrudes from that side 38 of the booster seat 22. The adjustment belt 56 and the latch mechanism 58 together form an adjuster used to retract or pay out the latch belts 40 relative to the booster seat 22. As will be evident to those having ordinary skill in the art, the adjustment belt 56 can be routed to and extend from either side 38 of the booster seat 22 as desired.

The latch mechanism 58 can be a conventional one-way latch mechanism, which can allow the adjustment belt 56 extended from the latch mechanism simply by pulling on the adjustment belt. The user can do so freely in order to shorten the length of exposed portions of the latch belts 40, i.e., the anchor ends 42, to securely anchor the booster seat 22 to the vehicle seat 26. This type of one-way latch mechanism 58 is well known in the art. The latch mechanism 58 can include a release button 60 or lever that can be actuated to release the grip of the latch mechanism on the adjustment belt 56. When released, the anchor ends 42 can be paid out in a rearward direction from the booster seat 22 as needed. Again, as will be evident to those having ordinary skill in the art, the latch mechanism 58 can vary in configuration and construction and yet function as intended. These types of latch mechanisms are often found on infant and toddler car seats for adjusting tension in the safety harness system. These types of latch mechanisms are also found on conventional vehicle harness or safety belt systems.

When installing a typical child restraint system, such as the booster seat 22, the caregiver or user is typically standing or kneeling outside of the vehicle and looking at the side 38 of the booster seat. By placing the latch mechanism 58 and the exposed portion of the adjustment belt 56 on the one side 38 of the booster seat 22 facing the user, the user can readily access and grasp the adjustment belt to tighten and secure the anchor latch system 20. The user can also pull the adjustment belt 56 directly toward them when doing so, which makes adjusting and tightening the anchor latch system 20 much easier and user friendly. Instead of having to awkwardly pull the adjustment belt 56 from the front end 36 on the booster seat 20 in the narrow space toward the front seat of the vehicle, the user can pull the adjustment belt directly toward them. The disclosed anchor latch system 20 also allows the user to pull on the single adjustment belt 56 to simultaneously adjust both of the latch belts 40.

In one example, two different child restraint systems could be provided for consumers, one configured for use on the left-hand side of the vehicle and one configured for use on a right-hand side of a vehicle. The difference in these two products would be that the adjuster, i.e., the latch mechanism 58 and adjustment belt 56, would be positioned on one side of the child restraint system or the other, as needed. In another example, the child restraint system can be designed so that the user can selectively install or alter the position of the adjuster, including the latch mechanism 58 and adjustment belt 56 on a desired side 38 of the product. In this example, the booster seat 22 can be provided so that the user can access the latch mechanism 58 and/or the adjustment belt 56 to position the adjuster on the desired side 38 of the product.

FIGS. 3 and 4 illustrate another example of an anchor latch system 70 constructed in accordance with the teachings of the present invention. The anchor latch system 70 can also be utilized on any type of child restraint system. In this example, the anchor latch system 70 is depicted as being carried on a bottom portion 72 of a generic child restraint system. The anchor latch system 70 again has two generally parallel and spaced apart latch belts 74 that are partly housed within the bottom portion 72. Anchor ends 76 of the latch belts 74 protrude rearward from a rear end 77 of the bottom portion 72. Each of the anchor ends 76 has a connector 78 that is connected to the fixed anchors 24 of the vehicle seat 26 as previously described.

In this example, the anchor latch system 70 has an axle or shaft 80 that is housed within the bottom portion 72. The shaft 80 extends laterally across the bottom portion 72 between opposed sides 82. The shaft 80 is retained by a bearing or shaft housing 84 that is fixed within the bottom portion 72 and is configured for rotation about its lengthwise axis L. Two belt spools 86 are carried on the shaft 80, one positioned near each corresponding side 82 of the bottom portion 72 and aligned with a respective one of the latch belts 74. The belt spools 86 are fixed to the shaft 80 so as to rotate in conjunction with the shaft. A proximal end of each latch belt 74 is affixed to a respective one of the spools 86. Each end of the shaft 80 extends to the exterior of the bottom portion on each side 82 of the bottom portion. An actuator or knob 88 is affixed to each exposed end of the shaft 80.

As shown in FIGS. 3 and 4, an adjuster, i.e., a one-way ratchet mechanism 90 in this example, is coupled to the shaft 80 and is shown relatively generically herein. The ratchet mechanism 90 has a plurality of teeth 92 on an outer circumference of a gear 94 that is carried on the shaft 80. A spring biased dog or pawl 96 engages the teeth 90. The teeth 92 have a tooth profile that permits rotation of the shaft 80 in one direction indicated by the arrow R, while the pawl 96 resiliently ratchets along the teeth. The pawl 96 prevents free rotation of the gear 94 in the opposite direction. Rotating the shaft in the direction R winds up the latch belts 40 on the belt spools 86.

A release element 98 has an actuator 100 connected via a rod 102 to the pawl 96. A spring 104 is captured between a stop surface 106 on the bottom portion 72 and a stop 108 on the rod 102. The spring 104 biases the pawl 96 into engagement with the teeth 92, but allows the pawl to ratchet along the teeth when the shaft is rotated in the wind-up direction R. The actuator 100 can be pulled in the direction of the arrow PL outward in this example against the bias of the spring 104 to disengage the pawl 96 from the teeth 92.

In this example, a user can grasp either of the knobs 88 and rotate the shaft 80 to retract or withdraw the latch belts 74 into the bottom portion 72 in order to adjust and tighten the anchor latch system 70. The pawl 96 and gear teeth 92 will hold the tightened latch belts 74. The user can pull out on the actuator 100 in the PL direction against the spring bias to release the pawl 96 from the teeth. This will allow the latch belts 74 to be paid out or extended from the bottom portion 72 as needed.

In this example, the user can install the child restraint system on either side of a vehicle and yet have easy access to the adjuster of the anchor latch system 70. The user need only grasp the exposed knob 88 on the nearest side of the bottom portion 72 and rotate the knob to adjust the anchor latch system 70. Thus, the child restraint system in this example is universal and can be used on either side of a vehicle without modification.

The specifics of the anchor latch system 70 can vary from the example shown and described herein. The knobs 88 can have gripping elements on the knob surface to make it easier for a user to rotate the knobs and adjust the latch belts 74. The shaft 80, shaft housing 82, spools 86, and adjuster can vary as well from this example. For example, the spools could be eliminated and the latch belts connected directly to the shaft. The spools can also be used in other embodiments disclosed herein, if desired.

Figure 5:
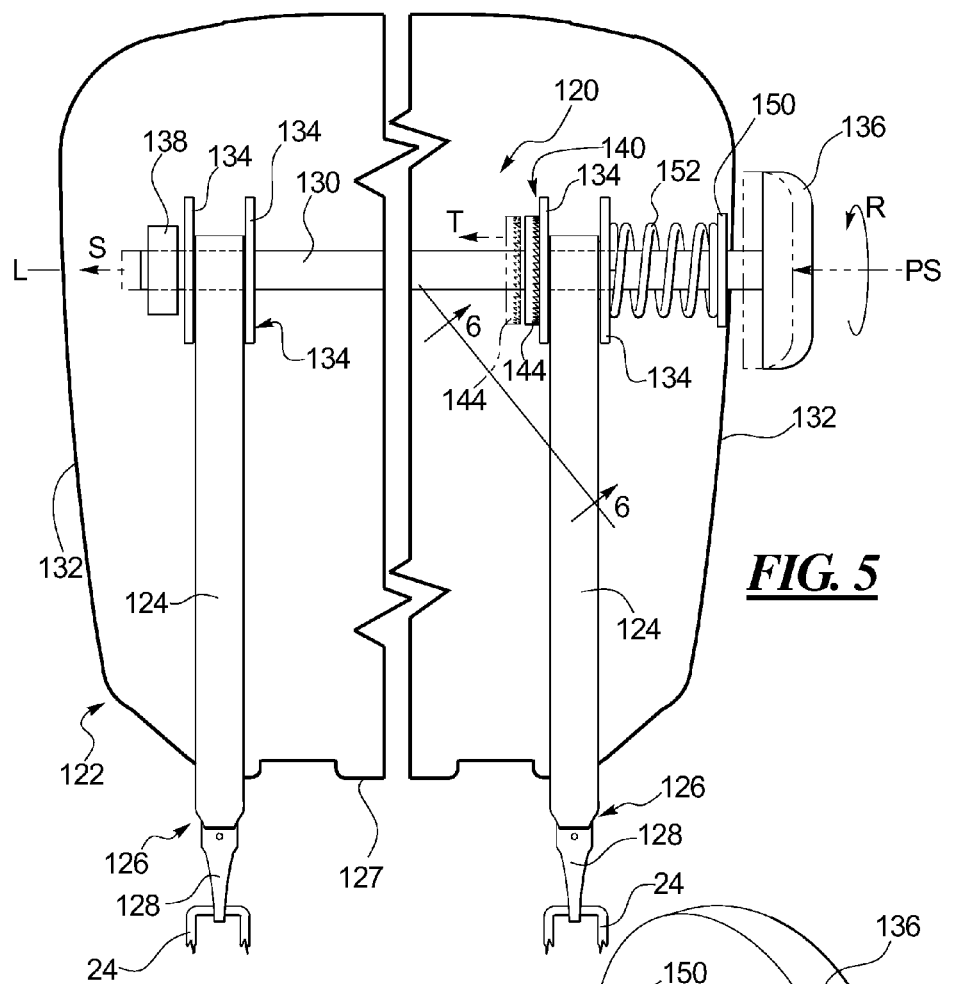
FIG. 5 shows a schematic or simplified top view of another example of an anchor latch system for a child restraint system and constructed in accordance with the teachings of the present invention.
Figure 6:
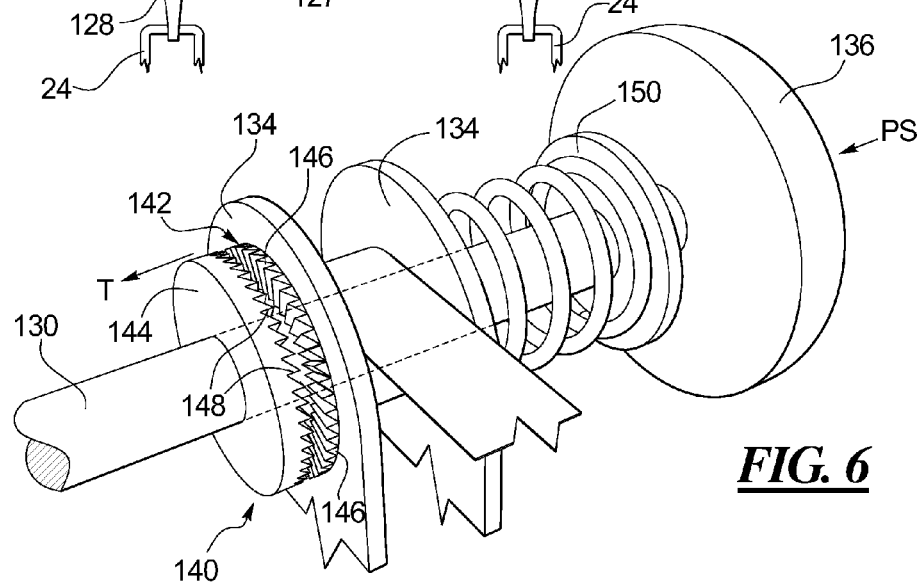
FIG. 6 shows a close up perspective view of a portion of the anchor latch system shown in FIG. 5.

FIGS. 5 and 6 show yet another example of an anchor latch system 120 for a child restraint system and constructed in accordance with the teachings of the present invention. The anchor latch system 120 can again be utilized on any type of child restraint system. In this example, the anchor latch system 120 is depicted as being carried on a bottom portion 122 of a generic child restraint system. The anchor latch system 120 again has two generally parallel and spaced apart latch belts 124 that are partly housed within the bottom portion 122. Anchor ends 126 of the latch belts 124 protrude rearward from a rear end 127 of the bottom portion 122. Each of the anchor ends 126 has a connector 128 that is connected to the fixed anchors 24 of the vehicle seat 26 as previously described.

In this example, the anchor latch system 120 has an axle or shaft 130 that is housed within the bottom portion 122. The shaft 130 extends laterally across the bottom portion 122 between opposed sides 132 of the bottom portion 122. The shaft 130 can again be retained by a bearing or shaft housing (not shown) that is fixed within the bottom portion 122 and the shaft 130 is configured for rotation about its lengthwise axis L. A plurality of supports or brackets 134 is carried on the bottom portion 122 and supports the shaft 130 for rotation about the axis L. The brackets 134 also allow the shaft 130 to translate or slide in the direction of the arrow S along the axis L. A pair of the brackets 134 is aligned with a corresponding one of the latch belts 124. A proximal end of each latch belt 124 is affixed to the shaft 130 so that the latch belts wind up onto or unwind from the shaft as the shaft rotates. At least one end of the shaft 130 extends to the exterior of the bottom portion 122 on one of the sides 132. An actuator or knob 136 is affixed to that exposed end of the shaft 130. The other end of the shaft 130 can be supported on a bearing support arm 138 on the opposite side 132 of the furthermost bracket 134. Though not shown herein, the other end of the shaft 130 can instead extend to the exterior of the other side 132 of the bottom portion 122. A knob can be fixed to that other shaft end and at least be actuable to rotate the shaft to retract or withdraw the latch belts 124 into the bottom portion 122. This would permit a user to tighten the latch belts 124 from either side 132 of the bottom portion 122.

As shown in FIGS. 5 and 6, an adjuster, i.e., a one-way ratchet mechanism 140 in this example, is coupled to the shaft 130 and is shown relatively generically herein. The ratchet mechanism 140 in this example has a pair of toothed elements that can be selectively engaged or disengaged. In this example the toothed elements are in the form of two mating face gears 142, 144, each having a plurality of teeth 146, 148, respectively, on an axial face of each gear. The first face gear 142 in this example is mounted to or is formed as an integral part of one of the brackets 134 and is fixed both rotationally and axially relative to the bottom portion 122. The second face gear 144 is fixed to the shaft 130 and can both slide axially in the S direction and can rotate with the shaft. The teeth 148 of the second face gear 144 engage the teeth 146 on the first face gear 142. The mating teeth 146, 148 have a tooth profile that permits rotation of the shaft 130 and the second face gear 144 in one direction indicated by the arrow R relative to the first face gear 142 and teeth 146. The second face gear 144 and the shaft 130 can move axially along the axis L.

A spring stop 150 is fixed to the shaft 130. A spring 152 is captured between the spring stop 150 and a surface on one of the shaft supports or brackets 134. The spring 152 biases the shaft 130 and thus the teeth 148 of the second face gear 144 into engagement with the teeth 146 of the first face gear 142, as shown in FIG. 5. The tooth profile on the two face gears 142, 144 allows the shaft 130 and face gear 144 to rotate in the direction of the arrow R relative to the first face gear 142, but prevents free rotation of the shaft 130 and second face gear in the opposite direction. Rotating the shaft 130 in the direction R winds up the latch belts 124 on the shaft 130, retracting them into the bottom portion 122.

The knob 136 in this example can be pushed inward in the direction of the arrow PS toward the bottom portion 122 against the spring bias force. This moves the shaft 130 and the second face gear 144 axially in the S direction to release the teeth 146, 148 of the two face gears 142, 144 from one another, as shown in phantom in FIG. 5 and as shown in FIG. 6. The spring 152 biases the knob 136 outward and thus biases the second gear teeth 148 into engagement with the first gear teeth 146, but allows the teeth 148 to ratchet along the teeth 146 when the shaft 130 and knob 136 are rotated in the wind-up direction R. The knob 136 can be manipulated as a release actuator by being pushed in the PS toward the bottom portion 122 against the bias force of the spring 152.

In this example, a user can grasp the knob 136 and rotate the shaft 130 in the R direction to retract or withdraw the latch belts 124 into the bottom portion 122 in order to tighten the anchor latch system 120. The mating gear teeth 146, 148 will hold the adjusted length of the latch belts 124. The user can push inward on the knob 136 against the spring bias to release the second teeth 148 from the first teeth 146. This will allow the latch belts 124 to be paid out or extended from the bottom portion 122 as needed.

In this example, the user can install the child restraint system on one side with the knob 136 exposed to that side of the vehicle, providing easy access to the adjuster of the anchor latch system 120. The user need only grasp the exposed knob 136 and rotate the knob to adjust the anchor latch system 120. This is a much easier movement than having to awkwardly pull on a strap sideways to the user's body toward a front seat of the vehicle. The child restraint system in this example can be modified to render it universal so that the adjuster is readily accessible on either side of the bottom portion. Such a modification would include adding the second knob to the other end of the shaft 130, as noted above. The user could then tighten the latch belts 124 by rotating the second knob. In such an example, the user could also loosen the anchor latch system 120 by pulling on the second knob to release the face gear teeth 146, 148.

The specifics of the anchor latch system 120 can vary from the example shown and described herein. The knob 136 can have gripping elements on the knob surface to make it easier for a user to rotate the knob and adjust the latch belts 124. The shaft 130, shaft housing, brackets 134, and adjuster components can vary as well from this example.

Figure 7:
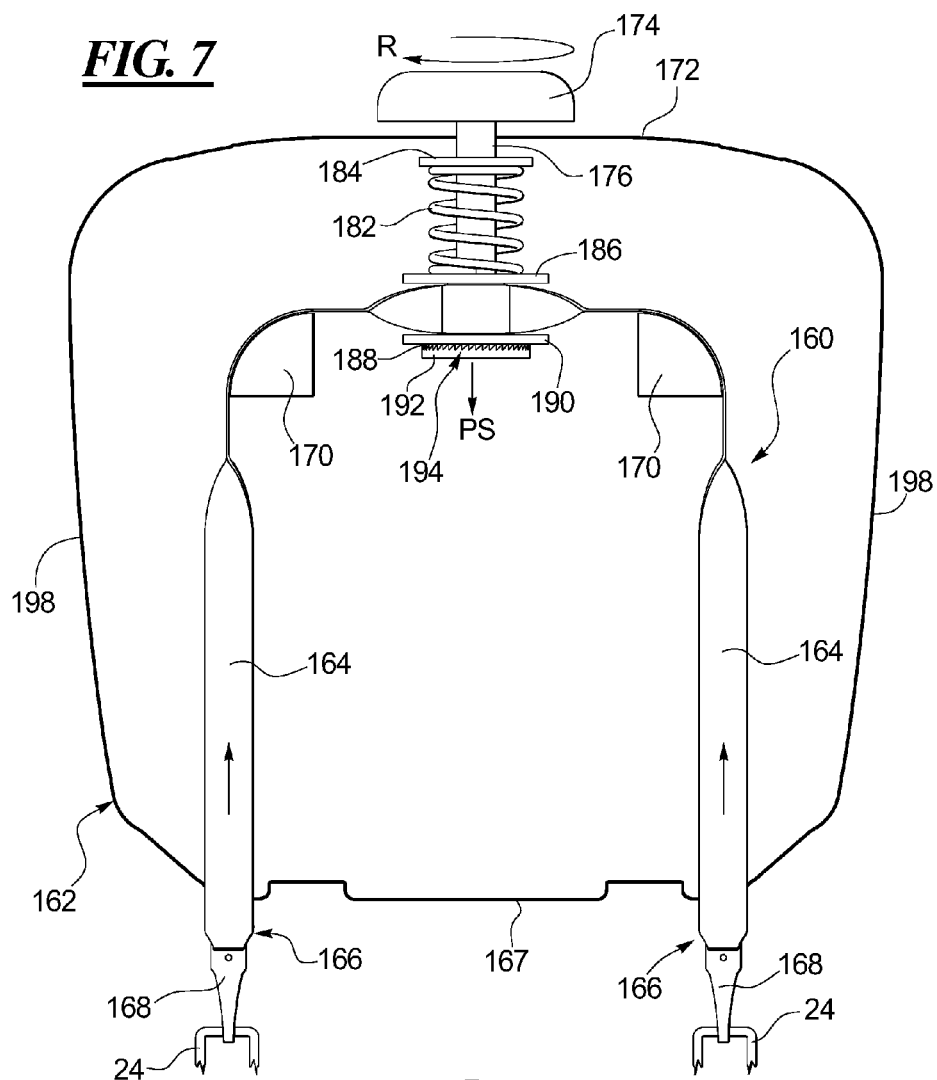
FIG. 7 shows a schematic or simplified top view of another example of an anchor latch system for a child restraint system and constructed in accordance with the teachings of the present invention.
Figure 8:
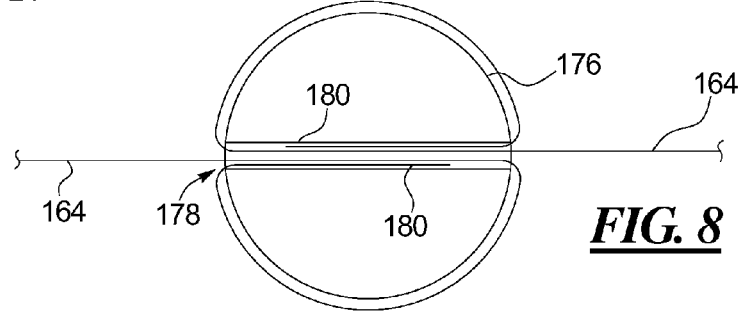
FIG. 8 shows a cross-section taken along line 8-8 of the anchor latch system shown in FIG. 7.

FIGS. 7 and 8 show yet another example of an anchor latch system 160 for a child restraint system and constructed in accordance with the teachings of the present invention. In this example, the anchor latch system 160 is again shown with a generic bottom portion 162 of a child restraint system. The anchor latch system 160 in this example again has a pair of spaced apart latch belts 164 partially housed within the bottom portion 162 and each belt has an anchor end 166 protruding outward from a rear end 167 of the bottom portion 162. The latch belts 164 are generally parallel to one another and to the lengthwise axis of the bottom portion. Connectors 168 on the anchor ends 166 can be latched to the anchor points or anchors 24 of the vehicle as noted above. Guides 170 are provided within the bottom portion 162 that redirect each latch belt 164 through a right angle bend so that each latch belt extends toward the other and toward the central axis of the bottom portion 122. An adjuster in this example is provided on a front end 172 of the bottom portion 162 and is aligned with the central axis. The adjuster has a knob 174 positioned on the exterior of the front end 172 of the bottom portion 162. A rod 176 extends from the knob 174 through the front end 172 and into the bottom portion 122. As shown in FIG. 8, the latch belts 164 are threaded from opposite sides through a radial slot 178 passing through the rod 176. The latch belts 164 are wrapped a half turn around the rod 176 in the same direction. A free end 180 of each latch belt 164 is secured within the slot 178, thereby fixing the latch belts to the rod 176.

A spring 182 on the rod 176 is captured between and abuts against a stop 184 at one end carried on the rod 176 and against a fixed stop surface on a bracket 186 on the bottom portion 162. A pair of toothed elements is also provided as part of the adjuster in this example. The toothed elements again include a first face gear 188 that is stationary and affixed to a surface of another bracket 190 on the bottom portion 162. The rod 176 is supported by the spaced apart brackets 186, 190 for rotation and translation. The toothed elements also include a second face gear 192 that is affixed to an end of the rod 176 and can rotate with the rod about the rod axis L and can also translate axially along the axis L with the rod in the direction of the arrow S. Mating sets of teeth 194 on the two face gears 188, 192 mesh with one another when the first and second face gears engage one another, similar to the previously described embodiment. The spring 182 biases the knob 174 and rod 176 in an outward direction relative to the bottom portion 162.

The knob 174 can be rotated in the direction of the arrow R to wind up the latch belts 164 around the rod 176. The mating teeth 194 will ratchet relative to one another when the knob 174 and rod 176 are rotated in the R direction. The mating teeth 194 will prevent rotation of the knob 174 and rod 176 in the opposite direction. However, the user can push the knob 174 toward the bottom portion 162 in the PS direction against the spring bias in order to disengage the mating teeth 194 of the first and second face gears 188 and 192 (see the phantom view of the face gear 192 in FIG. 9). This will permit rotation of the knob 174 in the opposite direction to pay out or impart slack to the latch belts 164.

A user can rotate the knob 174 in the direction of the arrow R, wrapping the latch belts 164 around the rod 176 in order to retract or withdraw the latch belts 164 into the bottom portion 162. This adjusts or tightens the latch belts. The connectors 168 on the anchor ends 166 are connected to the loops of the fixed anchors 24 to latch the bottom portion 162 to the vehicle seat 26. The user can push the knob 174 inward in the PS direction toward the bottom portion 162 to disengage the adjuster, rotate the knob in the opposite direction, and payout or extend the latch belts 164 when needed.

Figure 9:
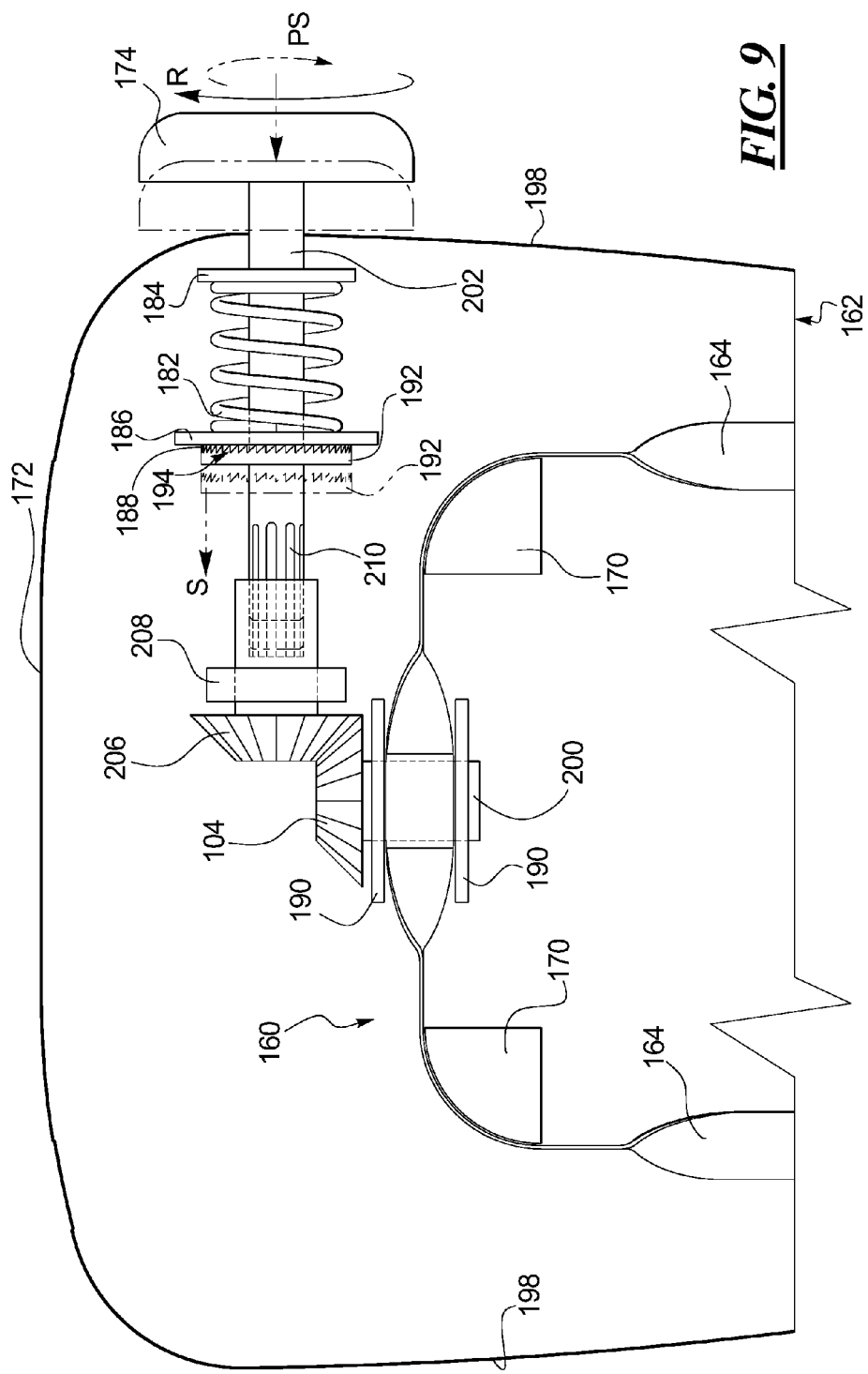
FIG. 9 shows a schematic or simplified top view of a modified version of the anchor latch system depicted in FIG. 7.

As with the previous embodiments, specifics of the adjuster and the anchor latch system 160 can vary from the example described. The above noted examples for the prior described anchor latch systems may apply equally to the anchor latch system 160. Another such example is illustrated in FIG. 9. In this embodiment, the adjuster is positioned on a side 198 of the bottom portion 162 instead of on the front end 172. In order to achieve this configuration, the rod 176 is replaced by a split rod. The split rod has a first rod portion 200 and a second rod portion 202. The first rod portion 200 is connected to the latch belts 164 via the slot 178, which is provided in the first rod portion. A second rod portion 202 extends through the side 198 of the bottom portion 162 and is connected to the knob 174. The first rod portion 200 is supported by a pair of the brackets 190, with the latch belts 164 aligned between the brackets. The second rod portion 202 is supported by one of the brackets 186 for rotation about its rod axis.

A first bevel gear 204 is connected to one end of the first rod portion 200 and the first rod portion is supported for rotation by a bracket 186 on the bottom portion 162. A second bevel gear 206 is connected to a rotatable end of a bearing coupling 208. A splined end 210 of the second rod portion 202 engages a portion of the bearing coupling 208. The splined end 210, when rotated, will rotate the bearing coupling 208, which in turn will rotate the second bevel gear 206. The splined end 210 and bearing coupling 208 create a slip joint between the bevel gear 206 and rod portion 202 to permit translation of the second rod portion 202 in the S direction to release the meshed gear teeth 194, as described above, without affecting the position of the second bevel gear. The bevel gears 204 and 206 allow for a 90° bend in the split rod. Rotation of the knob 174 in the R direction will rotate the second rod portion 202 and the second bevel gear 206. The second bevel gear 206 in turn will rotate the first bevel gear 204, which will rotate the first rod portion 200. This will wind up the latch belts 164 around the first rod portion 200 as described above for the embodiment shown in FIGS. 7 and 8.

In this embodiment, a single adjuster is provided on the side 198 of the bottom portion 162. The adjuster can be manipulated to adjust both of the latch belts 164 simultaneously. It is possible to provide a second adjuster on the other side 198 of the bottom portion 162. The second adjuster can have an identical knob, another second rod portion, and another second bevel gear that is also meshed to the first bevel gear 204. In such an embodiment, the user can rotate the knob on either side of the bottom portion 162 to simultaneously adjust both of the latch belts 164.

Figure 10:
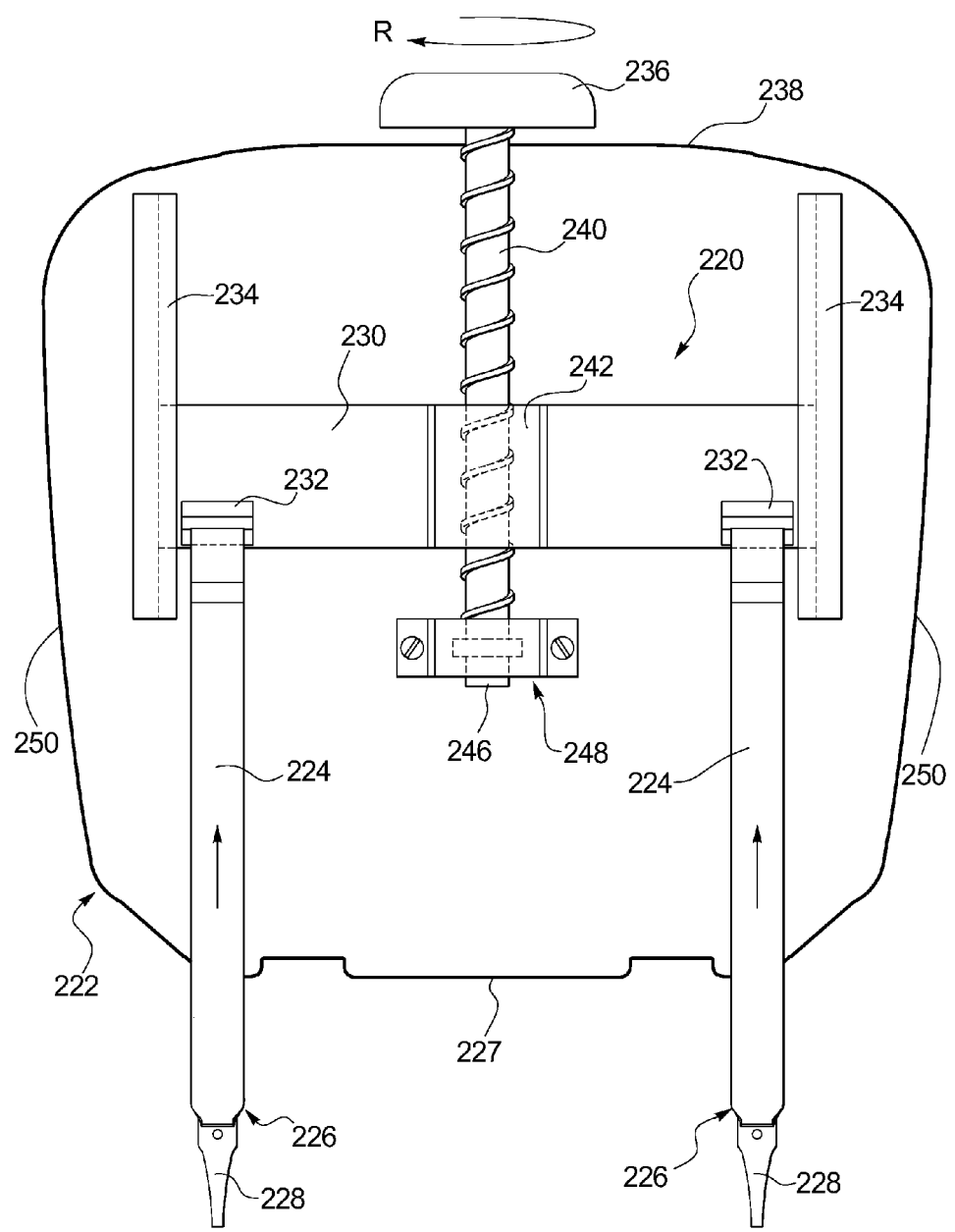
FIG. 10 shows a schematic or simplified top view of another example of an anchor latch system for a child restraint system and constructed in accordance with the teachings of the present invention.
Figure 11:
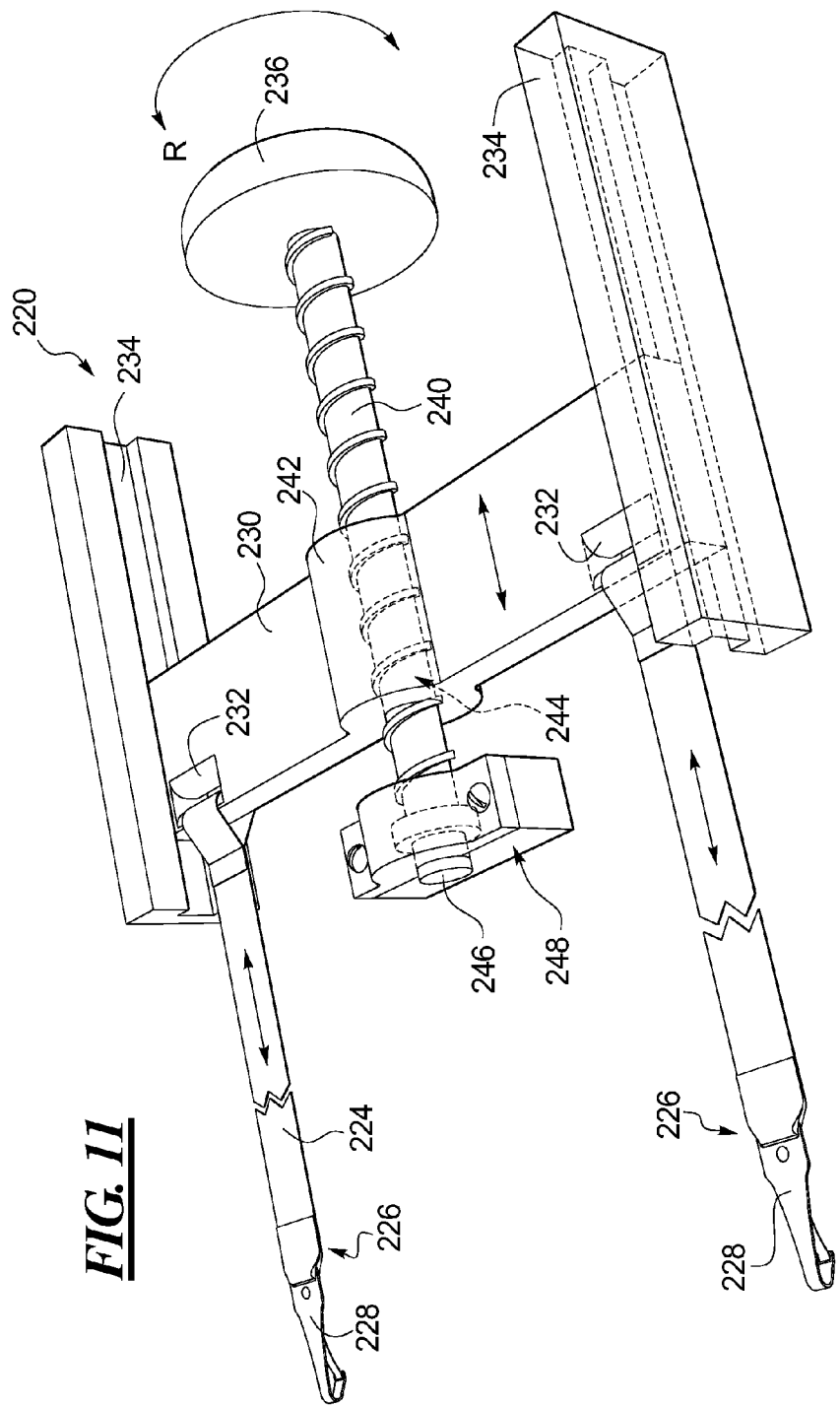
FIG. 11 shows a close up perspective view of a portion of the anchor latch system shown in FIG. 10.

FIGS. 10 and 11 show still another example of an anchor latch system 220 for a child restraint system and constructed in accordance with the teachings of the present invention. The anchor latch system 220 is again carried by a generic bottom portion 222 of a child restraint system. This example also has a pair of latch belts 224 partly housed within the bottom portion 222 and each has an anchor end 226 protruding rearward from a rear end 227 of the bottom portion. Connectors 228 on the anchor ends 226 can connect to the vehicle anchors 24 or anchor points. Free ends of the latch belts 224 are tethered to an adjuster. In this example, the adjuster has a yoke 230 extending transversely relative to the bottom portion 222. The latch belts 224 are tethered to the yoke 230 via slots 232 provided in the yoke. Opposite ends of the yoke 230 are slidably received in laterally spaced apart guide tracks 234 housed within the bottom portion 222.

The adjuster also has a knob 236 positioned externally and centrally on a front end 238 of the bottom portion 222. The knob is connected to a shaft 240 that has male threads formed along the shaft. The yoke 230 has a central hub 242 with a bore 244 through which the shaft 240 extends. The bore 244 includes corresponding female threads (not specifically shown). A free end 246 of the shaft 240 is received through a bearing 248 that is affixed to the bottom portion 222. The bearing 248 in this example axially holds the shaft 240, i.e., along the axis L, but allows free rotation of the shaft about the axis L.

A user can rotate the knob 236 in the direction of the arrow R to rotate the shaft 240. Since the shaft 240 is stationary in the axial direction along its axis L, the male and female threads will drive the yoke 230 relative to the shaft along the axis L. The ends of the yoke 230 will slide along the tracks 234 toward the knob 236. This will retract or withdraw the latch belts 224 into the bottom portion 222. The anchor ends 226 of the latch belts 224 have connectors 246 that can be connected to the fixed anchors 24 of the vehicle seat 26. The bottom portion 222 is latched in this manner to the seat 26. The knob 236 can be rotated in the R direction to adjust and secure the bottom portion 122 on the vehicle seat 26. The knob 236 can be rotated in the opposite direction, which will slide the yoke 230 along the tracks 234 and move the yoke away from the knob. This in turn will impart slack to the latch belts 224, thus permitting them to be paid out or extended from the bottom portion 222. Though not shown herein, a lock or latch can be provided that can secure the knob and shaft in a set position. Thus, the knob and shaft could be rotated to achieve a desired latch belt tension and length and then locked or latched in that position until released when needed.

Figure 12:
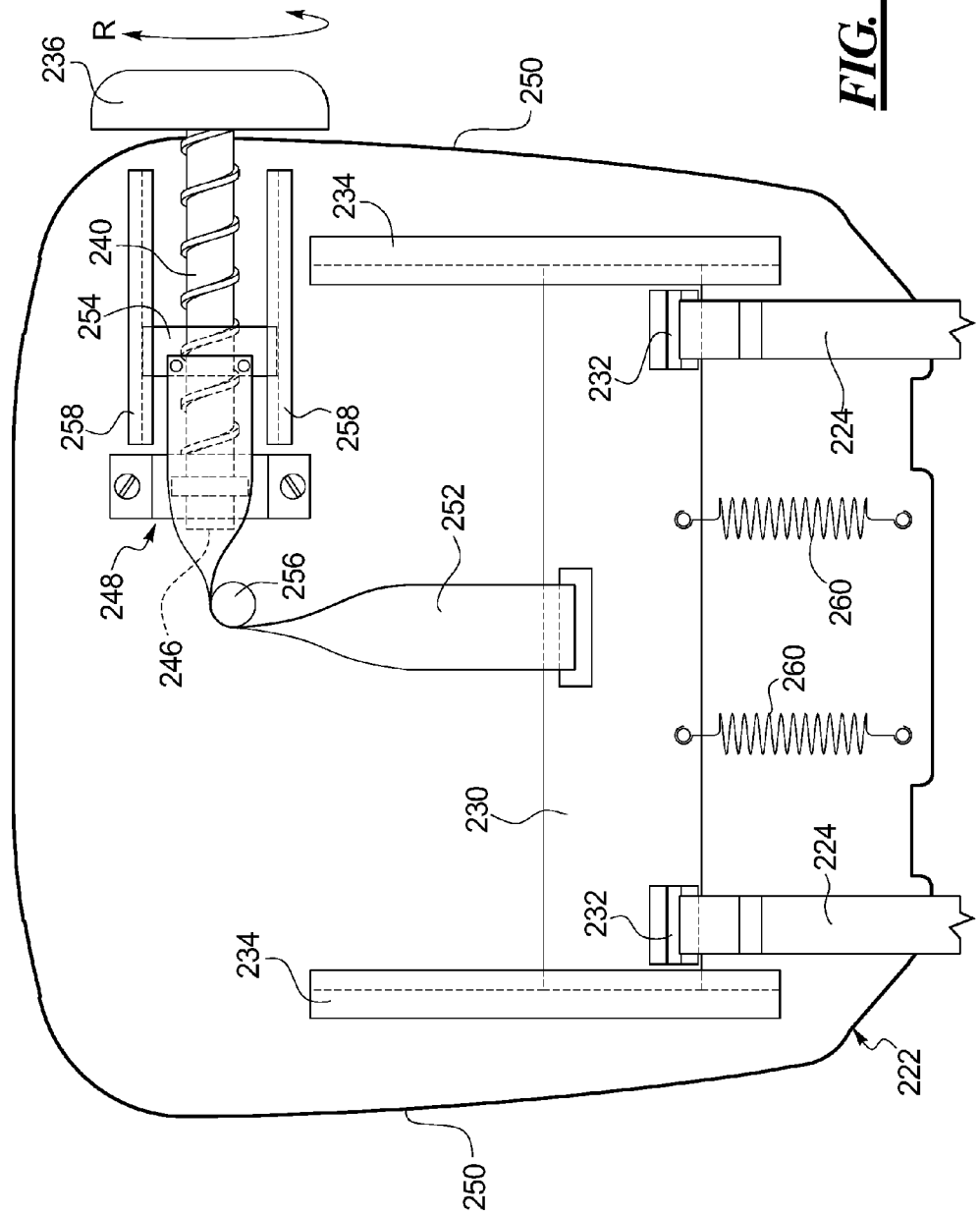
FIG. 12 shows a schematic or simplified top view of a modified version of the anchor latch system depicted in FIG. 10.

As with the prior embodiment, the anchor latch system 220 and the corresponding adjuster can vary within the spirit and scope of the present invention. The examples discussed above with reference to the prior described anchor latch systems may apply equally to the anchor latch system 220. FIG. 12 illustrates another of many possible examples. In this example, a portion of the adjuster, including the knob 236 and threaded shaft 240, is moved to a side 250 of the bottom portion 222 instead of the front end 238. An adjustment belt 252 can be connected to the yoke 230 at one end and to a threaded block 254 coupled to the threaded shaft 240 at the other end. The threaded block 254 can be captured between tracks 258 so as to prevent its rotation about the shaft, but permitting it to move axially along the shaft axis L.

When a user rotates the knob 236, the threaded block 254 will move along the axis L of the shaft 240. Instead of the shaft 240 being directly connected to the yoke 230, the shaft 240 is indirectly connected to the yoke 230 by the adjustment belt 252 in this embodiment. A guide 256 is provided to redirect the adjustment belt 252 from a direction parallel to the central axis for the portion connected to the yoke 230 to a direction perpendicular to the central axis for the portion connected to the threaded block 254. One or more springs 260 can be provided within the tracks or elsewhere and can be connected to the yoke 230. The springs 260 can bias the yoke and thus the latch belts 224 to an extended or paid out position. This will overcome the fact that the adjustment belt 252 cannot push the yoke 230 and help to return the yoke and the threaded block 254 toward a home position when the knob 236 is rotated opposite to the R direction.

Several of the examples disclosed above can employ a rotatable knob for adjusting the latch belts. In some examples, the knob is positioned on the front end of the bottom portion of the restraint system. Rotating a knob positioned at the front end is much easier for a user than having to awkwardly pull on an adjustment strap, sideways across their body, toward a front seat of the vehicle as required to adjust many prior known systems.

The disclosed anchor latch systems employ two latch belts that are adjustable through a central adjuster. The disclosed systems can be utilized on an infant car seat base, a booster seat, a car seat, and the like. The systems allow a user to tighten and secure or release the latch or anchor belts to properly and easily anchor the seat portion to the fixed anchor points on a vehicle seat.

The disclosed systems utilize right and left anchor points on a vehicle seat and utilize conventional webbing, i.e., straps, belts, or harnesses that attach to the anchor points. The two sections of webbing, i.e., the latch belts, protrude through or from the back end of the seat base, booster, or seat. Both webbing sections are joined together beneath or within the bottom portion or seat part, and in some examples continue as a single webbing section. The single webbing section then connects with an adjuster at the front end or side of the seat part to secure and retain or hold a desired adjusted tension in the webbing. The disclosed adjusters allow a user to first connect the two webbing sections or latch belts to the anchor points and then to shorten the webbing sections to secure the seat part in position on the vehicle seat.

Each disclosed adjuster has a release mechanism or release capability to allow the webbing of the latch belts to be paid out or loosened. Loosening of the latch belts increases separation between the seat part and the anchor points. The user can then access the anchor points to detach the webbing sections from the anchor points. The disclosed anchor latch systems thus make it easier for a user to install and remove a child restraint system in or from a vehicle.

The disclosed anchor latch systems can be used on any child restraint system or seat product that is to be installed into a vehicle with fixed anchor points and/or an anchor latch system. The disclosed systems can be used on seats having on-board harness systems for the child or can be used on booster type seats. The disclosed anchor latch systems are adjustable to be loosened or tightened to allow for easy adjustment from the side of the product and vehicle. Even the disclosed systems having a rotatable adjuster on the front of the seat part are easier to use. This is because a number of the disclosed systems only require rotation of a knob instead of pulling on a strap or webbing.

Some of the disclosed systems allow the seat part to be installed on the vehicle seat with the adjuster facing the open back door. The caregiver can easily access the adjuster and thus easily adjust and secure, or release, the anchor latches to and from the anchor points of the vehicle seat. The disclosed anchor latch systems are thus easier to use than prior known anchor latch adjustment systems.

A booster seat or other seat product can employ the disclosed anchor latch systems to create an adjustable, secure attachment to the vehicle seat. The seat part or product will then not become a projectile during a crash. This is particularly true when a child is not seated in the seat, or when a child is seated in the seat but only using an on-board harness restraint, i.e., not utilizing the vehicle's lap or shoulder belt system.

The disclosed systems will allow easier adjustment of the anchors from the side of the seat part, allow easier and better access for the caregiver to the anchor points and the seat adjuster, and increase the ease of adjustment. A number of the disclosed systems also place the adjuster/actuator out of direct reach of a child seated in the seat.

When the knobs disclosed herein are rotated to retract or withdraw the latch belts into the bottom portion, this can be described as the tightening direction or the like. When the knobs are rotated to pay out or extend the latch belts from the bottom portion, this can be defined as the loosening direction or the like. When the adjustment belts disclosed herein are pulled outward to retract or withdraw the latch belts into the bottom portion, this can also be described as the tightening direction or the like. When the adjustment belts are retracted back toward the bottom portion to pay out or extend the latch belts from the bottom portion, this can be defined as the loosening direction or the like.

Although certain anchor latch systems and components, and child restraint systems, have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child restraint system comprising:
a bottom portion configured to rest on a dedicated seat of a vehicle, the bottom portion having a front end, a rear end, and a pair of sides extending between the front and rear ends and spaced apart from one another across the bottom portion; and
an anchor latch system carried by the bottom portion, the anchor latch system having
two latch belts partially housed within the bottom portion and each having an anchor end protruding rearward from and external to the bottom portion,
an adjustment belt exposed on at least one side of the pair of sides and coupled to the two latch belts,
two first belt guides each placed and positioned within the bottom portion to redirect a respective one of the two latch belts toward the other of the two latch belts,
two second belt guides each placed and positioned within the bottom portion to redirect a respective one of the latch belts toward the adjustment belt, and
a third belt guide placed and positioned within the bottom portion to redirect the adjustment belt toward the at least one side,
wherein the adjustment belt can be manipulated to selectively retract or pay out the two latch belts simultaneously.

2. A child restraint system according to claim 1, wherein the bottom portion is a seat bottom or a booster seat.

3. A child restraint system according to claim 1, wherein the bottom portion is a base on which a child seat can be mounted.

4. A child restraint system according to claim 1, further comprising:
a Y-joint connecting the two latch belts to one another within the bottom portion.

5. A child restraint system according to claim 4, wherein the adjustment belt is connected to the two latch belts at the Y-joint.

6. A child restraint system according to claim 1, further comprising:
a Y-joint within the bottom portion where the two latch belts are connected to the adjustment belt, the Y-joint between the two belt guides and the third belt guide.

7. A child restraint system according to claim 6, wherein the adjustment belt extends through the at least one side and is connected to the two latch belts at the Y-joint.

* * * * *